(12) United States Patent
Verschuere et al.

(10) Patent No.: US 7,431,991 B2
(45) Date of Patent: Oct. 7, 2008

(54) FUEL MANAGEMENT SYSTEM COMPRISING A FLUOROELASTOMER LAYER HAVING A HYDROTALCITE COMPOUND

(75) Inventors: Alain Verschuere, Ghent (BE); Tatsuo Fukushi, Woodbury, MN (US); Erik D. Hare, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 510 days.

(21) Appl. No.: 11/072,884

(22) Filed: Mar. 4, 2005

(65) Prior Publication Data

US 2005/0147828 A1 Jul. 7, 2005

Related U.S. Application Data

(62) Division of application No. 10/348,393, filed on Jan. 21, 2003, now abandoned.

(51) Int. Cl.
*F16L 11/00* (2006.01)
(52) U.S. Cl. .................... 428/422; 428/36.9; 428/36.91
(58) Field of Classification Search ................. 428/422, 428/36.91, 36.9
See application file for complete search history.

(56) References Cited

U.S. PATENT DOCUMENTS

| 4,000,356 | A |   | 12/1976 | Weisgerber et al. |   |
|---|---|---|---|---|---|
| 4,214,060 | A |   | 7/1980 | Apotheker et al. |   |
| 4,243,770 | A |   | 1/1981 | Tatemoto et al. |   |
| 4,501,869 | A |   | 2/1985 | Tatemoto et al. |   |
| 4,745,165 | A |   | 5/1988 | Arcella et al. |   |
| 4,831,085 | A |   | 5/1989 | Okabe et al. |   |
| 4,887,647 | A |   | 12/1989 | Igarashi et al. |   |
| 5,320,888 | A |   | 6/1994 | Stevens |   |
| 5,374,484 | A | * | 12/1994 | Kasahara et al. | ............ 428/421 |
| 6,106,914 | A |   | 8/2000 | Kanbe et al. |   |
| 6,150,485 | A | * | 11/2000 | Saito et al. | .................. 526/206 |
| 6,303,699 | B1 | * | 10/2001 | Naraki et al. | ............ 525/326.3 |
| 6,340,511 | B1 |   | 1/2002 | Kanbe et al. |   |
| 6,610,761 | B1 | * | 8/2003 | Matsumoto et al. | ......... 522/112 |
| 6,963,015 | B2 | * | 11/2005 | Otsuka et al. | ............... 570/125 |
| 7,148,300 | B2 | * | 12/2006 | Fukushi et al. | ............... 526/247 |
| 2006/0052558 | A1 | * | 3/2006 | Morikawa et al. | ........... 526/247 |

FOREIGN PATENT DOCUMENTS

| EP | 0101930 A2 | 3/1984 |
|---|---|---|
| EP | 0097330 B1 | 9/1986 |
| EP | 0407937 A1 | 1/1991 |
| EP | 0661304 A1 | 7/1995 |
| EP | 0769521 A1 | 4/1997 |
| EP | 0784064 A1 | 7/1997 |
| JP | 04252254 A | 9/1992 |
| JP | 05287150 A | 11/1993 |
| JP | 07082449 | 3/1995 |
| JP | 10139970 A | 5/1998 |
| JP | 2002-265731 A | 9/2002 |
| RU | 2000123688 | 8/2002 |

\* cited by examiner

*Primary Examiner*—Peter D. Mulcahy
*Assistant Examiner*—Henry Hu
(74) *Attorney, Agent, or Firm*—Julia A. Lapos-Kuchar

(57) ABSTRACT

A component of a fuel management system having a surface that in use will come into contact with fuel. The surface includes a fluoroelastomer layer. The fluoroelastomer layer comprises a hydrotalcite compound dispersed therein.

2 Claims, 1 Drawing Sheet

FUEL MANAGEMENT SYSTEM COMPRISING A FLUOROELASTOMER LAYER HAVING A HYDROTALCITE COMPOUND

CROSS REFERENCE TO RELATED APPLICATIONS

This application is a divisional of U.S. Ser. No. 10/348,393, filed Jan. 21, 2003 now abandoned, the disclosure of which is herein incorporated by reference.

FIELD OF THE INVENTION

The present invention relates to a component of a fuel management system comprising a fluoroelastomer layer, i.e. a layer of cured fluoropolymer having a fluorinated backbone, and a hydrotalcite compound dispersed therein. In particular, the present invention relates to the use of a hydrotalcite compound to improve the resistance of the fluoroelastomer layer when brought in contact with diesel fuel, more in particular with diesel fuel of biological origin.

BACKGROUND OF THE INVENTION

The beneficial properties of fluoroelastomers are well known in the art and include for example, high temperature resistance, high chemical resistance including for example high resistance to solvents, fuels and corrosive chemicals and non-flammability. Because of these beneficial properties, fluoroelastomers find wide application particularly where materials are exposed to high temperature and/or chemicals.

For example, fluoroelastomers are used in fuel management systems which include for example fuel storage components, such as a fuel tank, fuel pump couplers, filler neck-hoses, fuel tank cap seal and the like; fuel delivery components, such as fuel line hoses and tubings, fuel filler lines, fuel supply lines and in particular high temperature fuel lines in cars or other motor vehicles because of their excellent resistance to fuels and because of the good barrier properties that can be achieved with fluoroelastomers.

The fluoropolymers, which upon curing yield the fluoroelastomers are generally more expensive than non-fluorine polymers and accordingly, materials have been developed in which the fluoropolymer is used in combination with other materials to reduce the overall cost. For example, it has been proposed to use a relatively thin layer of fluoroelastomer as an inner layer of a multilayer hose where the outerlayer of the hose is then a non-fluorine elastomer. For example U.S. Pat. No. 6,106,914 relates to a hose, having a laminate structure, comprising of a first layer formed of a fluoro rubber or a fluoro resin and as second layer formed of an epichlorohydrin. U.S. Pat. No. 6,340,511 relates to a fuel hose comprising an inner layer of fluoroelastomer and an outer layer formed from a blend of polyvinyl chloride (PVC) and acrylonitrile butadiene rubber (NBR) that are adhered well by vulcanisation.

In recent years, increased environmental concerns have led to the development of low emission diesel fuel, i.e. diesel fuel of biological origin, comprising vegetable oil methyl ester. At severe conditions, i.e. high temperature and humidity, hydrolysis products can be formed that will accelerate swelling and deterioration of the currently used fuel management systems. A need exists for a fuel management system having improved barrier properties. Accordingly, it would be desirable to find a way of improving the resistance of a fluoroelastomer layer, used in fuel management systems, when brought in contact with diesel fuel, more in particular with diesel fuel of biological origin.

SUMMARY OF THE INVENTION

In one embodiment, the present invention provides a component of a fuel management system having a surface that in use will come into contact with fuel, said surface comprising a fluoroelastomer layer. The fluoroelastomer layer comprises a hydrotalcite compound dispersed therein.

In a further aspect, the present invention relates to the use of a hydrotalcite compound in the fluoroelastomer layer of a fuel management component to prevent or reduce swelling of the fluoroelastomer layer when said fluoroelastomer layer is brought in contact with fuel, more in particular with diesel fuel of biological origin.

Still in a further aspect, the present invention provides a method of making a component of a fuel management system comprising the steps of
- providing a curable fluoroelastomer composition comprising a fluoropolymer having one or more halogens capable of participating in a cure reaction, an organic peroxide and a hydrotalcite compound; and
- curing and shaping said curable fluoroelastomer composition to form a fluoroelastomer layer that in use will be in contact with fuel.

By the term 'fuel' in connection with this invention is meant fuel used to drive a combustion engine in particular a diesel engine. The term fuel in connection with this invention includes in particular fuel or fuel mixtures comprising diesel of biological origin.

By the term 'fuel management system' is meant the total of components as used in storing, supplying, metering and control of fuel emission and that are exposed to or come in contact with fuel. Fuel management systems include components comprised in a motor vehicle as well as components of systems exterior to a motor vehicle. Without limitation, components of a fuel management system include fuel storage components such as fuel tanks, filler neck hoses and fuel tank cap seals, fuel supply components such as fuel line hoses or tubings used in a motor vehicle, fuel filler hose for filling fuel to a fuel tank of a motor vehicle, valves, diaphragms and fuel injector components, fuel connector components such as quick connect O-rings, emission control components such as emission control seals, air intake manifold gaskets and solenoid armatures.

BRIEF DESCRIPTION OF THE DRAWINGS

The following figures are included by way of further illustration of some embodiments of the present invention. It will be understood that these drawings merely serve to illustrate the invention without limiting the invention in any way thereto.

DETAILED DESCRIPTION OF THE INVENTION

Figure 1:
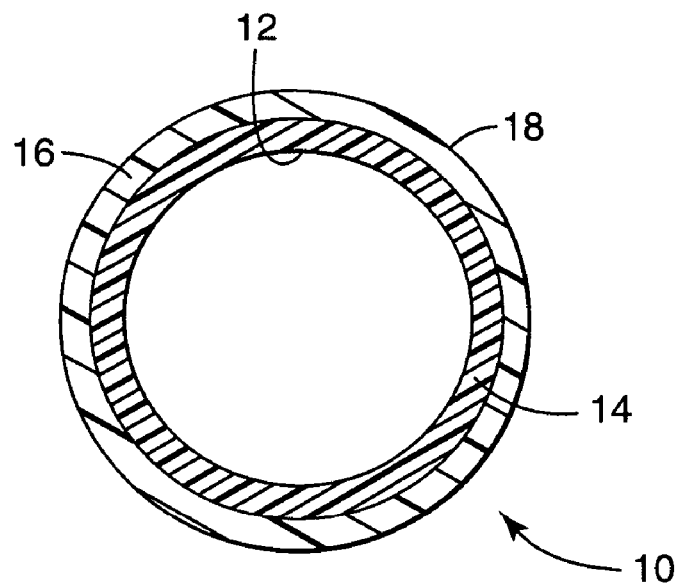
FIGS. 1 and 2 are cross-sectional schematic representations of multi-layer hoses or tubes that can be obtained with the invention.

The hydrotalcite compound used in the present invention may comprise a natural or synthetic hydrotalcite compound or mixture thereof. Particularly suitable hydrotalcite compounds are Mg and/or Al hydrocarbonate minerals of synthetic or natural origin. Examples of natural compounds include Hydrotalcite $Mg_6Al_2(OH)_{16}CO_3 \cdot 4H_2O$ and members of the hydrotalcite group, such as; Stichtite $Mg_6Cr_2(OH)_{16}CO_3 \cdot 4H_2O$; Pyroaurite $Mg_6Fe(III)_2(OH)_{16}CO_3 \cdot 4H_2O$; Desautelsite $Mg_6Mn(III)_2(OH)_{16}CO_3 \cdot 4H_2O$ and the like.

The hydrotalcite compound may also be of a synthetic hydrotalcite compound. Examples of synthetic hydrotalcite compounds include: $Mg_6Al_2(OH)_{16}CO_3.4H_2O$, $Mg_{4.5}Al_2(OH)_{13}CO_3.3.5H_2O$, $Mg_{4.5}Al_2(OH)_{13}CO_3$, $Mg_4Al_2(OH)_{12}CO_3.3.5H_2O$, $Mg_5Al_2(OH)_{14}CO_3.4H_2O$, $Mg_3Al_2(OH)_{10}CO_3.1.7H_2O$, $Mg3ZnAl_2(OH)_{12}CO_3.wH_2O$ and $Mg_3ZnAl_2(OH)_{12}CO_3$. Synthetic hydrotalcites that are commercially available, include for example those available from Kisuma Chemicals BV under the name DHT-4A™ and DHT-4V™ and ZHT-4A™; and Hycite™ 713 which is available from Ciba Specialties Chemicals.

Hydrotalcite compounds that can be used in connection with the present invention include in particular those that can be represented by the formula:

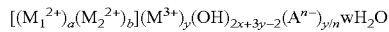

wherein $M_1^{2+}$ represents at least one divalent metal selected from the group consisting of $Mg^{2+}$, $Ca^{2+}$, $Sr^{2+}$ and $Ba^{2+}$; $M_2^{2+}$ represents at least one divalent metal selected from the group consisting of $Zn^{2+}$, $Cd^{2+}$, $Pb^{2+}$ and $Sn^{2+}$; $M^{3+}$ represents a trivalent metal ion; $A^{n-}$ represents an n-valent anion, such as $F^-$, $Cl^-$, $Br^-$, $NO_3^-$, $CO_3^{2-}$, $SO_4^{2-}$, $Fe(CN)_6^{4-}$, $CH_3COO^-$, oxalic acid ion or salicylic acid ion; a and b respectively represent a value from 0 to 10, x represents a+b and has a value from 1 to 10, y represents an integer from 1 to 5, and w represents a real number.

The hydrotalcite compound is typically used in the fluoroelastomer layer in an amount between 0.3 and 20% by weight relative to the amount of fluoroelastomer and preferably between 0.5 and 10% by weight.

The fluoroelastomer layer comprises a fluoropolymer having a partially or fully fluorinated backbone. Particularly preferred fluoropolymers are those that have a backbone that is at least 30% by weight fluorinated, preferably at least 50% by weight fluorinated, more preferably at least 65% by weight fluorinated. Examples of fluoropolymers for use in this invention include polymers of one or more fluorinated monomers optionally in combination with one or more non-fluorinated monomers. Examples of fluorinated monomers include fluorinated $C_2$-$C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$-$C_8$ olefins such as ethylene (E) and propylene (P).

Examples of perfluorovinyl ethers that can be used in the invention include those that correspond to the formula:

$$CF_2=CF-O-R_f$$

wherein $R_f$ represents a perfluorinated aliphatic group that may contain one or more oxygen atoms.

Particularly preferred perfluorinated vinyl ethers correspond to the formula:

$$CF_2=CFO(R^a{}_fO)_n(R^b{}_fO)_mR^c{}_f$$

wherein $R^a{}_f$ and $R^b{}_f$ are different linear or branched perfluoroalkylene groups of 1-6 carbon atoms, in particular 2 to 6 carbon atoms, m and n are independently 0-10 and $R^c{}_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

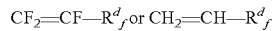

wherein $R^d{}_f$ represents a perfluoroalkyl group of 1 to 10, preferably 1 to 5 carbon atoms. A typical example of a perfluoroalkyl vinyl monomer is hexafluoropropylene.

The fluoropolymers for use in connection with the present invention can be made in accordance with any of the known polymerization methods for making fluoropolymers. Such methods include without limitation, aqueous emulsion polymerization, suspension polymerization and polymerization in an organic solvent.

The fluoropolymer for use in connection with the present invention is a substantially amorphous polymer that shows hardly any melting point if at all. Such fluoropolymers are particularly suitable for providing fluoroelastomers, which are typically obtained upon curing of an amorphous fluoropolymer. Amorphous fluoropolymers include for example copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, TFE-P, VDF-TFE-HFP, VDF-TFE-PVE, TFE-PVE, E-TFE-PVE and any of the aforementioned copolymers further including units derived from a chlorine containing monomer such as CTFE. Still further examples of suitable amorphous copolymers include copolymers having a combination of monomers as in CTFE-P.

Preferred amorphous fluoropolymers generally comprise from 20 to 85%, preferably 50 to 80% by moles of repeating units derived from VDF, TFE and/or CTFE, copolymerized with one or more other fluorinated ethylenically unsaturated monomer and/or one or more non fluorinated $C_2$-$C_8$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

The fluoropolymer will typically be cured. The fluoropolymer layer may be cured by any of the methods known to those skilled in the art and will typically include a cure composition such that the fluoropolymer layer can be cured. The cure composition typically includes one or more components that cause the fluoropolymer chains to link with each other thereby forming a three dimensional network. Such components may include catalysts, curing agents and/or coagents.

In a preferred embodiment of curing the fluoropolymer layer a so called peroxide cure system may be used. In a typical peroxide cure system, the fluoropolymer is provided with one or more cure sites that comprise a halogen capable of participating in a peroxide cure reaction and the composition for providing the fluoropolymer contains an organic peroxide. The halogen capable of participating in a peroxide cure reaction is typically bromine or iodine and may be distributed along the polymer chain and/or may be contained in the end groups of the fluoropolymer. Typically, the amount of bromine or iodine contained in the fluoropolymer is between 0.001 and 5%, preferably between 0.01 and 2.5%, by weight with respect to the total weight of the fluoropolymer. It has further been found that also chlorine is capable of participating in a peroxide cure reaction of the fluoropolymer if an organic compound comprising a hydride function MH, where M is selected from Si, Ge, Sn or Pb, is present. Accordingly, also fluoropolymers that contain chlorine atoms and/or bromine or iodine can be used for curing in a peroxide cure reaction. The amount of chlorine in the fluoropolymer may vary from 0.001% by weight to 10% by weight but is typically between 0.01% by weight and 5% by weight based on the weight of fluoropolymer. The fluoropolymer for use in the peroxide cure reaction typically will have a molecular weight of $10^4$ to $5 \times 10^5$ g/mol and the molecular weight distribution can be monomodal as well as bimodal or multimodal.

In order to introduce halogens, which are capable of participation in the peroxide cure reaction, along the chain, the copolymerization of the basic monomers of the fluoropolymer can be carried out with a suitable fluorinated cure-site monomer (see for instance U.S. Pat. Nos. 4,745,165, 4,831,085, and 4,214,060). Such comonomer can be selected for instance from:

(a) bromo- or iodo-(per)fluoroalkyl-(per)fluorovinylethers having the formula:

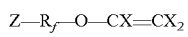

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2$—O—$CF$=$CF_2$, $BrCF_2CF_2$—O—$CF$=$CF_2$, $BrCF_2CF_2CF_2$—O—$CF$=$CF_2$, $CF_3CFBrCF_2$—O—$CF$=$CF_2$, and the like; and (b) bromo- or iodo perfluoroolefins such as those having the formula:

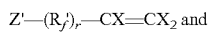

wherein each X independently represents H or F, Z' is Br or I, $R'_f$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo-olefins such as vinyl bromide and 4-bromo-1-butene; and (d) chlorine containing monomers including chlorine containing fluorinated monomers such as for example chlorine containing fluorinated $C_2$-$C_8$ olefins such as CTFE and non-fluorinated chlorine containing monomers such as chlorinated $C_2$-$C_8$ olefins such as vinyl chloride and vinylidene chloride.

In replacement of or in addition to the cure site comonomer, the fluoropolymer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I). Still further, the initiation and/or polymerization may be conducted in the presence of a halide salt such as a metal or ammonium halide including for example potassium chloride, sodium chloride, potassium bromide, ammonium bromide or chloride and potassium or sodium iodide to introduce a halide in a terminal position on the fluoropolymer.

Examples of chain transfer agents include those having the formula $R_fBr_x$, wherein $R_f$ is a x-valent (per)fluoroalkyl radical $C_1$-$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$, and the like. Further examples of suitable chain transfer agents are disclosed in U.S. Pat. No. 4,000,356, EP 407 937, EP 101 930 and U.S. Pat. No. 4,243,770.

Suitable organic peroxides are those which generate free radicals at curing temperatures. A dialkyl peroxide or a bis (dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1-3 parts of peroxide per 100 parts of fluoropolymer is used.

Another component which is usually included in a cure composition based on an organic peroxide, is a coagent composed of a polyunsaturated compound which is capable of cooperating with the peroxide to provide a useful cure. These coagents can be added in an amount equal to 0.1 and 10 parts per hundred parts fluoropolymer, preferably between 2-5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

In addition to the hydrotalcite compound, the fluoroelastomer layer may further contain acid acceptors as are commonly used in fluoroelastomer layers. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, etc. Organic acceptors include epoxies, sodium stearate, and magnesium oxalate. The amount of acid acceptors in addition to the hydrotalcite compound will generally depend on the amount of hydrotalcite compound used and the nature of the acid acceptor used. Typically, the amount of acid acceptor used should be such as to not eliminate the advantage and improvements brought about by the hydrotalcite component of the composition. Generally, the amount of the acid acceptor will be less than the amount of hydrotalcite used and will typically be less than 20% by weight relative to the weight of hydrotalcite used. As hydrotalcite itself functions as an acid acceptor, the use of additional acid acceptor is generally not necessary and thus additional acid acceptor may not need to be present in the composition.

The fluoropolymer composition for providing the fluoroelastomer layer may contain further additives, such as carbon black, stabilizers, plasticizers, lubricants, fillers, and processing aids typically utilized in fluoropolymer compounding, provided they have adequate stability for the intended service conditions.

The fluoropolymer compositions may be prepared by mixing a fluoropolymer, hydrotalcite, a cure composition and other additives in conventional rubber processing equipment. Such equipment includes rubber mills, internal mixers, such as Banbury mixers, and mixing extruders.

It is further possible to prepare a premix of the fluoropolymer composition whereby the premix comprises the fluoropolymer and part of other components of the full composition but not all of them. The composition of such a premix will depend on desired stability of the premix over a desired period of storage. For example, the premix may comprise the fluoropolymer, the hydrotalcite and one or more components of a cure composition but not all of the components necessary to obtain a curable composition. For example, in case the cure composition comprises peroxide, it will generally be desired to exclude the peroxide from the premix and only add the peroxide at the time of preparing the fluoropolymer composition for preparing the fluoroelastomer layer.

In accordance with the method of the present invention for making a component of a fuel management system, a curable fluoroelastomer composition comprising a fluoropolymer preferably having one or more halogens capable of participating in a cure reaction, an organic peroxide and a hydrotalcite compound is cured and shaped to form a fluoroelastomer layer that in use will be in contact with fuel. For example, the fluoroelastomer layer having the hydrotalcite compound may be an innermost layer of a fuel hose or a fuel tank. Typically, the hydrotalcite compound will be present in the fluoropolymer composition and the fluoropolymer composition may also include a cure composition as described above.

In one embodiment of the present invention for making a fuel management system, a relatively thin layer of fluoroelastomer is formed as innermost layer of a multilayer hose or tank where the outer layer of the hose or tank is a non fluoropolymer. Examples of non fluoropolymers include non-fluorine type of elastomers, such as silicone rubbers, acrylonitrile butadiene rubber (NBR), butadiene rubber, chlorinated and chloro-sulfonated polyethylene rubber, chloroprene, copolymers of ethylene and propylene (EPM) rubber, terpolymer of ethylene, propylene, and a diene (EPDM) rubber, ethylene oxide and chloromethyl oxirane (ECO) rubber, epichlorohydrin-ethylene oxide-allylglycidylether terpolymer (GECO), polyisobutylene, polyisoprene, polysulfide, polyurethane, blends of polyvinyl chloride and NBR, styrene butadiene (SBR) rubber, ethylene-acrylate copolymer rubber (VAMAC), and ethylene-vinyl acetate rubber and its hydrolysed form (EVOH) and thermoplastic elastomers derived from ethylene-propylene-diene terpolymer (EPDM), (EVOH) and a polypropylene. Bonding of the fluoropolymer layer to an elastomeric layer of a substrate may involve providing the fluoropolymer layer on a layer comprising a composition that upon curing forms the elastomeric layer. Particularly preferred outer layer can be formed from VAMAC or ECO.

Further outer layers can be a metal substrate or a plastic substrate including for example a non-fluorinated polymer. Examples of non-fluorinated polymers include a polyamide, a polyolefin, a polyurethane, a polyester, a polyimide, a polystyrene, a polycarbonate, a polyketone, a polyurea, a polyacrylate, and a polymethylmethacrylate, or a mixture thereof. Polyamides useful as the non-fluorinated polymeric substrate are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 can be used, as well as a polymer blend of nylon 6 and polyolefin.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers can be prepared by conventional free radical polymerization or catalysis of such ethylenically unsaturated monomers. The degree of crystallinity of the polymer can vary. The polymer may, for example, be a semi-crystalline high density polyethylene or can be an elastomeric copolymer of ethylene and propylene. Carboxyl, anhydride, or imide functionalities can be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers.

In another embodiment of the present invention for making a fuel management system, a relatively thin layer of fluoroelastomer, comprising hydrotalcite, can be used as innermost layer of a multilayer hose or tank, a second layer is formed by using a thermoplastic fluoropolymer, in particular a melt processable thermoplastic fluoropolymer and the outer layer can be formed of a non fluorochemical layer as decribed above. By the term "thermoplastic fluoropolymer" is meant a fluoropolymer that is at least partially crystalline such that a distinct melting point, typically 100° C. or more, can be identified for example through a DSC scan of the polymer. By the term "melt processible" is meant that the fluoropolymer has a melt viscosity such that it can be processed from the melt through typical melt extrusion equipment that is available. Preferably, the thermoplastic fluoropolymer is a fluoropolymer that is halogenated with one or more halogens selected from chlorine, bromine and iodine. Such halogen atoms may be introduced in the fluoropolymer by copolymerization of a bromine or iodine containing comonomer, e.g. as listed above, or through the use of chain transfer agents and/or initiator systems that introduce Br or I-atoms. Specific examples of thermoplastic fluoropolymers that may be used with this invention are copolymers having the following combination of monomers: CTFE-VDF; CTFE-TFE, CTFE-TFE-HFP, CTFE-TFE-HFP-VDF; CTFE-TFE-HFP-VDF-PPVE, CTFE-TFE-E; bromine or chlorine containing E-TFE copolymers and bromine or chlorine containing TFE-HFP-VDF copolymers.

Fuel management systems based on multiple layers such as a multi-layer hose having a fluoroelastomer layer bonded to a thermoplastic fluorochemical and/or non fluoropolymer can be produced by any of the known methods for making multi-layer articles. For example, each of the layers can be co-extruded to form a multi-layer hose. Bonding of the fluoroelastomer inner layer to the intermediate thermoplastic fluorochemical and/or the non fluorochemical outer layer may be affected by applying heat to a temperature of 120° C. to 200° C. and for 1 to 120 min (preferably 140° C. to 180° C.

and for 3 to 60 min). The heating may further be carried out while simultaneously applying pressure. It may, however, be desirable to further treat the resulting article, e.g. hose, for example, with additional heat, pressure, or both, to enhance the bond strength between the layers. One way of supplying additional heat when the multi-layer article is prepared by extrusion is by delaying the cooling of the multi-layer article at the conclusion of the extrusion process. Alternatively, additional heat energy can be added to the multi-layer hose by laminating or extruding the layers at a temperature higher than necessary for merely processing the components. For example, the finished article can be placed in a separate apparatus for elevating the temperature of the article such as an oven or autoclave. Combinations of these methods can also be used. The particular method or methods used will generally depend on the component of the fuel management system that is being produced.

In order to improve the bonding between the separate layers, a compound having one or more groups capable of participating in a free radical reaction, such as ethylenically unsaturated groups, may be used. The compound having such groups may be present in the non-fluorochemical layer and/or the fluoropolymer layers. For example, a compound having unsaturated groups may be the coagent of a peroxide cure composition described above. Generally, reacting the fluoropolymer layer to the non fluorochemical layer will also involve the use of a free radical generating compound such as for example a free radical polymerization initiator. Preferably, an organic peroxide is used as a free radical generating compound in particular if the fluoropolymer layer includes a peroxide cure system as a cure composition. However, also other free radical generating compounds can be used such as for example azo compounds.

Several layer arrangements of the fuel management system can be contemplated and used. For example, the fluorochemical elastomer layer, comprising hydrotalcite, may be provided as an innermost layer in a bilayer construction with a non fluorochemical polymer as outmost layer. Alternatively, a multilayer arrangement can be used in which a thermoplastic fluoropolymer is provided between two layers. For example, a fluoroelastomer layer, comprising hydrotalcite, can be used as an innermost and the outermost layer can be a non-fluorinated polymer layer including a non-fluorine type of elastomer.

According to one embodiment, a hose for use in a fuel management system can be made in which a layer of fluoroelastomer, comprising hydrotalcite, as an innermost layer, is bonded to a non-fluorine polymer, in particular an ethylene-acrylate copolymer rubber.

According to a further embodiment, a hose for use in a fuel management system can be made in which a fluoroelastomer layer, comprising hydrotalcite, as an innermost layer, is bonded to a thermoplastic fluorochemical as intermediate layer, that is bonded to a non-fluorine polymer, in particular an ethylene-acrylate copolymer or a silicone copolymer.

According to a further embodiment, a hose for use in a fuel management system can be made in which a fluoroelastomer layer, comprising hydrotalcite, as an innermost layer, is bonded to a non-fluorine polymer, such as ethylene vinyl acetate and its hydrolysed form (EVOH) as intermediate layer, that is bonded to a non-fluorine polymer, in particular an ethylene-acrylate copolymer or a silicone copolymer.

Figure 2:
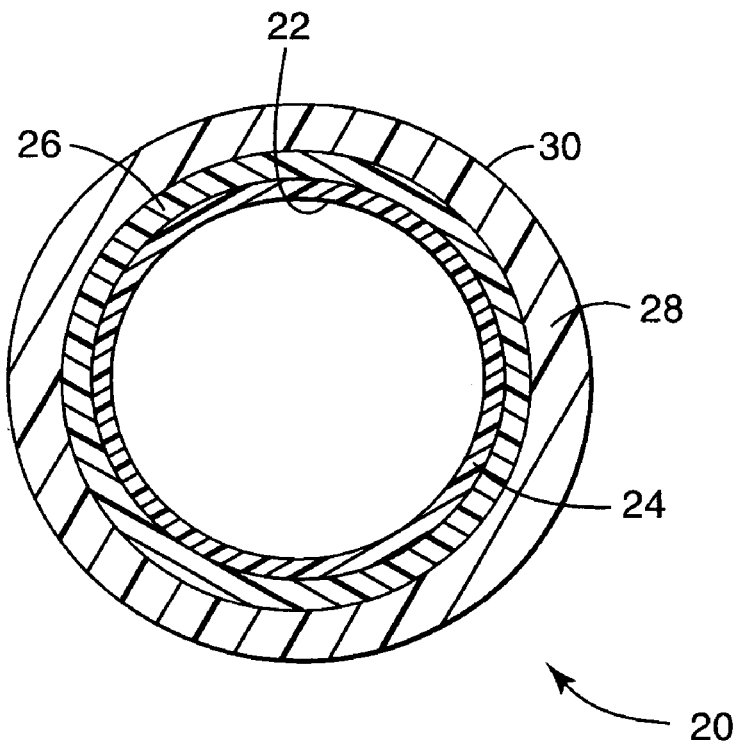

FIG. 1 and FIG. 2 further illustrate a component of a fuel management system according to this invention in the form of a tube or hose, for example, a hose suitable for use as a fuel line in an automobile system. Referring to FIG. 1, there is shown a two-layer article 10 that includes a relatively thick outer layer 18 bonded to an inner layer 14. Outer layer 16 is the non-fluorinated polymer layer, as described above, and is designed to provide article 10 with structural integrity. Outer layer 16 forms outer surface 18 of the hose. The non-fluorinated polymer can include an elastomer (e.g., silicone rubber, ethylene-acrylic rubber, and the like) and a plastic (e.g., polyamide). Inner layer 14 is the fluoroelastomer, comprising hydrotalcite. Inner layer 14 forms inner surface 12 of the hose. Inner layer 14 imparts chemical and thermal stability to the hose. Inner layer 14 also serves as a barrier or protective layer for outer layer 16 protecting it from fuel. Some or all of the layers can include an additive to render them electrically conductive. To further enhance structural integrity, reinforcing aids such as fibers, mesh, braid, and/or a wire screen can be incorporated in article 10, e.g., as separate layers or as part of an existing layer.

Referring to FIG. 2, there is shown a three-layer article 20 that includes a relatively thick outer layer 28 bonded to an intermediate layer 26, which is bonded to a thinner inner layer 24. Outer layer 28 can be the non-fluorinated polymer layer, as described above, and is designed to provide article 20 with structural integrity. Outer layer 28 forms outer surface 30 of the hose. The non-fluorinated polymer can include an elastomer (e.g., ethylene-acrylate copolymer, silicone copolymer, nitrile rubber, epichlorohydrin rubber, and the like), which can improve the sealing properties of the article when the hose or tube is attached to a rigid connector. Inner layer 24 is a fluoroelastomer, comprising hydrotalcite. Inner layer 24 forms inner surface 22 of the hose. Inner layer 24 imparts chemical and thermal stability to the hose. Because of solvent and permeation resistance of the fluoroelastomer, comprising hydrotalcite, inner layer 24 improves the sealing properties preventing leaking at the ends. Intermediate layer 26 can be a thermoplastic fluoropolymer layer, which can add to the barrier properties of the inner layer. The combination of inner layer 24 and intermediate layer 26 minimizes the total amount of permeation from the hose and connections within a system. Some or all of the layers can include an additive to render them electrically conductive. To further enhance structural integrity, reinforcing aids such as fibers, mesh, braid, and/or a wire screen can be incorporated in article 20, e.g., as separate layers or as part of an existing layer. For example, not shown in the drawing, a reinforcement layer can be included in the composition between outer layer 28 and intermediate layer 26.

The invention will now be described with reference to the following examples without however the intention to limit the invention thereto. All parts are by weight unless indicated otherwise.

EXAMPLES

All parts and percentages are by weight unless stated otherwise

Abbreviations $Ca(OH)_2$: calcium hydroxide, Rhenofit CF, Rhein Chemie.

Trigonox™ 101 45B: organic peroxide, AKZO

Perkalink™ 301-50D: triallyl-isocyanurate, 50% on silicate carrier, Akzo

DIAK™ no. 8: trimethallyl-isocyanurate, available from DuPont Dow

FE-1: fluoropolymer of tetrafluoroethylene, vinylidene fluoride and hexafluoropropylene and further including bromotrifluoroethylene as a cure site monomer FE-2: fluoropolymer having cure sites, GF 300™, available from Dupont de Nemours MT N-990: carbon black, available from Cancarb.
Biodiesel : diesel comprising RME (rape seed oil methyl ester, available from Globus, Germany
DHT-4V™: hydrotalcite, available from Kisuma Chemicals BV and corresponding to the formula $Mg_{4.5}Al_2(OH)_{13}CO_3$ $3.5 H_2O$ Test Methods Cure and Theological properties of fluoroelastomer compositions were evaluated using the following test methods:

Physical property testing was obtained after 150 by 150 by 2 mm sheets were pressed and allowed to vulcanise for 15 minutes at 180° C. mold temperature followed by post-curing treatment by heating the sheets in a circulating air oven maintained at about 180° C. for 2 hours. Tensile Strength at Break, Elongation at Break and Stress at 100% Elongation were determined using an Instron™ mechanical tester with a 1 kN load cell in accordance with DIN 53504 (S2 die). Test specimen strips (dumbbell) were cut from post-cured sheets. All tests were run at a constant cross head displacement rate of 200 mm/min in fivefold. The values reported were averages of the five tests. Hardness Shore A (2"), Stress at 100% Elongation, Elongation at Break, and Tensile Strength at Break were reported in units of Mega Pascals (MPa), %, and MPa respectively.

EXAMPLES

Examples 1 to 3 and Comparative Examples C-1 to C-3

In examples 1 to 3 and comparative examples C-1 to C-3, curable compositions were made on a two-roll mill by mixing compounds as given in table 1. The compounds are presented in parts by weight per hundred parts by weight of fluoroelastomer (phr) as is custom in the rubber industry. Examples 1 to 3 contained hydrotalcite at a level as given in table 1, comparative examples C-1 to C-3 were made without the addition of hydrotalcite. Comparative example C-1 and C-3 contained 3 phr $Ca(OH)_2$ and comparative example C-2 contained 3 phr MgO as acid acceptors. Cured samples were subjected to biodiesel with or without addition of water and at a temperature and time as given in table 2. The volume swell is recorded in table 2. The physical properties of the cured samples were measured before and after they had been immersed in biodiesel or biodiesel+5% $H_2O$ for Ex 2, at reflux in open system at 150° C., during 504 hrs, followed by 22 hrs drying at 150° C. The results are given in table 3.

TABLE 1

Composition of fluoroelastomer compounds

| Compound | Ex 1 | Ex 2 | C-1 | C-2 | Ex 3 | C-3 |
| --- | --- | --- | --- | --- | --- | --- |
| FE-1 | 100 | 100 | 100 | 100 | / | / |
| FE-2 | / | / | / | / | 100 | 100 |
| MT N-990 | 30 | 30 | 30 | 30 | 30 | 30 |
| DHT-4V ™ | 3 | 1 | / | / | 3 | / |
| Ca(OH)$_2$ | / | / | 3 | / | / | 3 |
| MgO | / | / | / | 3 | / | / |
| Trigonox ™ 101 45B | 4.5 | 4.5 | 4.5 | 4.5 | 4.5 | 2.5 |

TABLE 1-continued

Composition of fluoroelastomer compounds

| Compound | Ex 1 | Ex 2 | C-1 | C-2 | Ex 3 | C-3 |
| --- | --- | --- | --- | --- | --- | --- |
| Diak ™ N°8 | 1.5 | 2 | 2 | 2 | 1.5 | / |
| Perkalink ™ 301-50D | / | / | / | / | / | 5 |

TABLE 2

Volume swell after immersion in biodiesel

| Volume swell (%) | Solvent | Ex 1 | Ex 2 | C-1 | C-2 | Ex 3 | C-3 |
| --- | --- | --- | --- | --- | --- | --- | --- |
| 96 hrs 150° C. | biodiesel | 3.3 | 2.5 | 16.1 | 3.5 | 2.4 | 4.6 |
| 288 hrs 150° C. | biodiesel | 2.9 | 3.1 | 38.4 | 4.3 | 3.3 | 9.2 |
| 504 hrs 150° C. | biodiesel | 3.1 | 2.9 | 47.2 | 34.2 | 3.0 | 39 |
| 288 hrs 150° C. | biodiesel + 5% H$_2$O | | 2.4 | | | | |

TABLE 3

Vulcanisate properties (press cured 15 min @ 180° C., post cured 2 hrs @ 180° C.), after immersion in biodiesel

| | Ex 1 | Ex 2 | C-1 | Ex 3 | C-2 | C-3 |
| --- | --- | --- | --- | --- | --- | --- |
| Hardness shore A (2") after immersion | 77 | 76 | 77 | 78 | 77 | 72 |
| difference to original (points) | 5 | 0 | 0 | 1 | 3 | 2 |
| Modulus 100% (Mpa) | 5.9 | 6.2 | 7.6 | 8.2 | 4.4 | 5.4 |
| % difference to original | 4 | 13 | 12 | 34 | 7 | 15 |
| Tensile (Mpa) | 18.0 | 17.0 | 6.3 | 15.5 | 18.2 | 12.3 |
| % difference to original | 10 | 6 | −64 | −13 | 0 | −40 |
| Elongation (%) | 185 | 181 | 84 | 155 | 232 | 183 |
| % difference to original | −2 | −5 | −54 | −19 | −7 | −27 |

The results in table 2 indicate that the addition of hydrotalcite to the fluoropolymer has a significant improvement on the swelling behaviour of the fluoroelastomer in contact with biodiesel. Even an extended exposure to biodiesel at high temperature did not cause severe swelling.

What is claimed is:

1. A method comprising utilizing a hydrotalcite compound in a fluoroelastomer layer of a fuel management component to prevent or reduce swelling of said fluoroelastomer layer when said fluoroelastomer is contacted with a diesel fuel of biological origin, wherein said hydrotalcite compound is present in an amount of 0.3 to 20% by weight based on said fluoroelastomer, and wherein the fluoroelastomer layer after immersion in diesel fuel of biological origin for 504 hours at 150° C. followed by 22 hours of drying at 150° C. possesses a Hardness Shore A difference of less than 5 points when tested according to DIN 53504.

2. A method according to claim 1 wherein the fluoroelastomer layer possesses a volume swell in biodiesel after 504 hours at 150° C. of less than 5%.

* * * * *

UNITED STATES PATENT AND TRADEMARK OFFICE
CERTIFICATE OF CORRECTION

PATENT NO.         : 7,431,991 B2  
APPLICATION NO. : 11/072884  
DATED              : October 7, 2008  
INVENTOR(S)       : Alain Verschuere Page 1 of 1

It is certified that error appears in the above-identified patent and that said Letters Patent is hereby corrected as shown below:

On the First Page, Column 2, under (Attorney, Agent, or Firm)
Line 1, delete "Julia" and insert -- Julie --, therefor.

Column 11
Line 9, delete "Theological" and insert -- rheological --, therefor.

Signed and Sealed this

Sixth Day of January, 2009

JON W. DUDAS  
*Director of the United States Patent and Trademark Office*